United States Patent
Spare et al.

(10) Patent No.: US 7,858,253 B2
(45) Date of Patent: Dec. 28, 2010

(54) TIME-BASED FUEL CELL PURGE METHOD

(75) Inventors: Bradley Spare, Oceanside, CA (US);
Milos Milacic, New Boston, MI (US);
William Sanderson, Commerce Township, MI (US)

(73) Assignee: Ford Global Technologies, Dearborn, MI (US)

( * ) Notice: Subject to any disclaimer, the term of this patent is extended or adjusted under 35 U.S.C. 154(b) by 1333 days.

(21) Appl. No.: 11/281,218

(22) Filed: Nov. 16, 2005

(65) Prior Publication Data
US 2007/0111046 A1 May 17, 2007

(51) Int. Cl.
*H01M 8/04* (2006.01)
(52) U.S. Cl. .................... 429/431; 429/432
(58) Field of Classification Search ............ None
See application file for complete search history.

(56) References Cited
U.S. PATENT DOCUMENTS

| | | | |
|---|---|---|---|
| 3,697,325 A | 10/1972 | Baude | |
| 3,850,696 A | 11/1974 | Summers et al. | |
| 5,763,113 A * | 6/1998 | Meltser et al. | 429/13 |
| 6,003,498 A | 12/1999 | Reddy | |
| 6,124,054 A | 9/2000 | Gorman et al. | |
| 6,242,120 B1 | 6/2001 | Herron | |
| 2001/0016276 A1 | 8/2001 | Yamanashi | |
| 2002/0022167 A1 | 2/2002 | Herron | |
| 2003/0022041 A1 | 1/2003 | Barton et al. | |
| 2006/0275645 A1* | 12/2006 | Gallagher et al. | 429/38 |

* cited by examiner

*Primary Examiner*—Jonathan Crepeau
(74) *Attorney, Agent, or Firm*—Damian Porcari; Tung & Associates

(57) ABSTRACT

A method of purging a fuel cell is disclosed. The method includes determining a running average current load on the fuel cell, a standard deviation of cell voltages of the fuel cell and/or a maximum change in cell voltage of the fuel cell. The fuel cell is purged if the running average current load exceeds an average current load standard, the standard deviation of cell voltages exceeds a standard deviation threshold value, or the maximum change in cell voltage exceeds a maximum allowed cell voltage change rate.

21 Claims, 3 Drawing Sheets

$k^{th}$ purge period - part of $(k+1)^{th}$ purge cycle $$T_{purge_k} = f\left(I_{ave_k}, STDEV(CellV), max\left(\frac{dCellV}{dt}\right)\right)$$

Current Running Average during $k^{th}$ purge cycle $$I_{ave_k}(t) = \frac{\int_0^t I(\tau)d\tau}{t} \quad \text{where } t \in \Delta_{purge_k}$$

$k^{th}$ purge cycle duration $$\Delta_{purge_k}$$

TIME-BASED FUEL CELL PURGE METHOD

FIELD OF THE INVENTION

The present invention relates to fuel cell systems. More particularly, the present invention relates to a time-based fuel cell purge method in which a fuel cell system is purged based on the total current supplied to the system during an operating cycle of the fuel cell.

BACKGROUND OF THE INVENTION

During the operation of a hydrogen-based fuel cell, there is an accumulation of impurities in the anode side due to cross-leaks and diffusion through membrane from the cathode side of the fuel cell. One of the methods which is used to reduce the impact of such accumulation is purging of the anode loop, wherein purging involves the removal of hydrogen from the anode loop. As can be appreciated by one skilled in the art, this can be done, for example, by the low cell purge, the differential pressure purge and the time-based purge, the latter of which is a preventive purge.

One of the problems associated with the time-based purge is determining the time and duration of the purge. The higher the load on the fuel cell, the more rapidly impurities accumulate in the anode loop of the fuel cell. Therefore, a time-based purge method is needed which is based on the average load on a fuel cell during a fuel cell operating cycle, and therefore, removes impurities from the anode loop in an efficient and timely manner.

SUMMARY OF THE INVENTION

The present invention is generally directed to a method of purging a fuel cell. The method includes determining a running average current load on the fuel cell, a standard deviation of cell voltages of the fuel cell stack and/or a maximum change in cell voltage of the fuel cell. The fuel cell is purged if the running average current load exceeds an average current load standard, the standard deviation of cell voltages exceeds a standard deviation threshold value, or the maximum change in cell voltage exceeds a maximum allowed cell voltage change rate.

BRIEF DESCRIPTION OF THE DRAWINGS

The invention will now be described, by way of example, with reference to the accompanying drawings, in which.

DETAILED DESCRIPTION OF THE INVENTION

Figure 1:
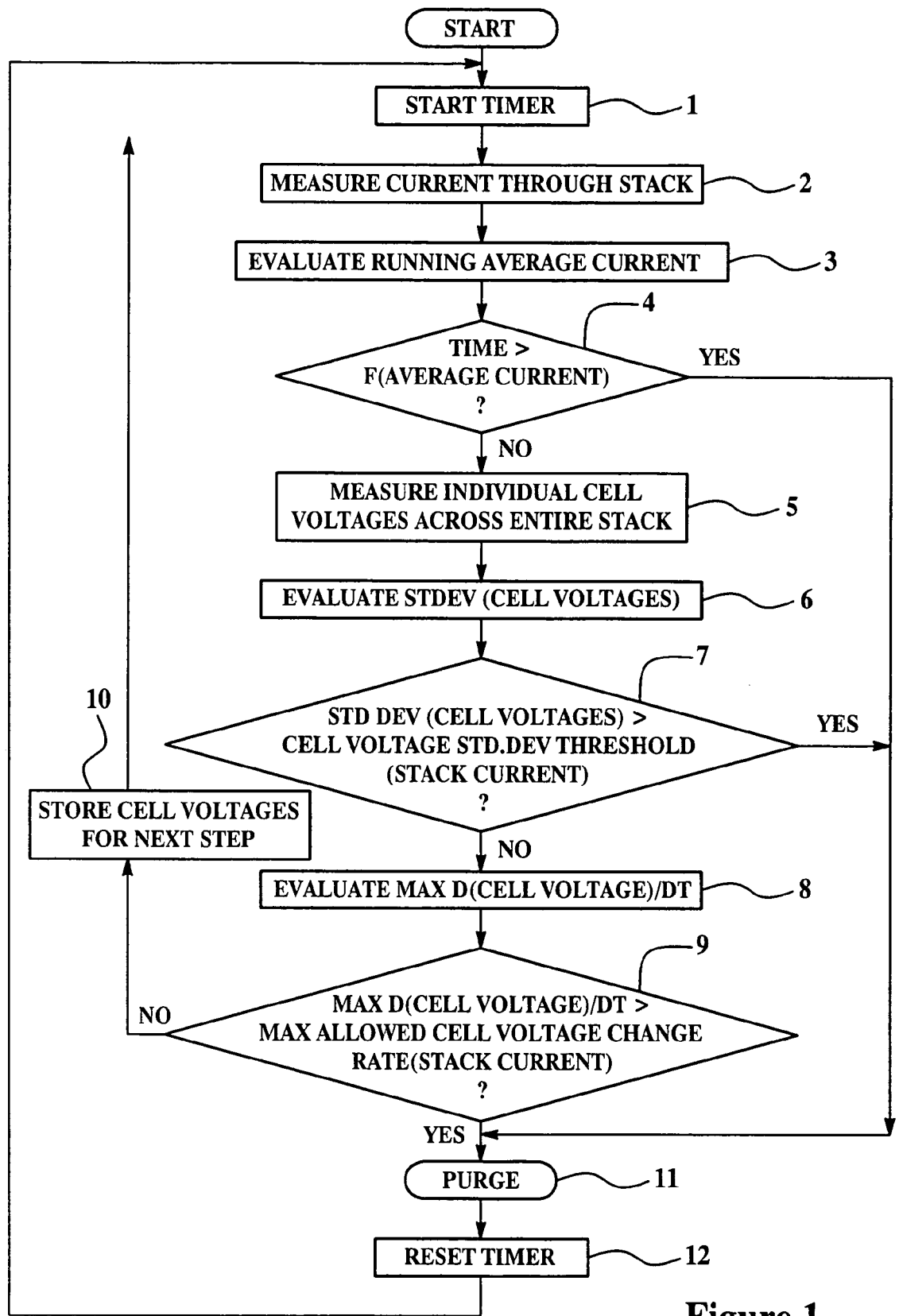
FIG. 1 is a flow diagram illustrating sequential process steps carried out in the determination of whether to initiate a fuel cell purge interval according to the time-based fuel cell purge method of the present invention.

The present invention is generally directed to a time-based fuel cell purge method in which purging of the anode loop of a fuel cell is based on the running average current load on the fuel cell during an operating cycle of a fuel cell. Because the accumulation of impurities in the anode loop of a fuel cell increases as the load on the fuel cell increases, implementing purging of the fuel cell as a function of the average current load on the fuel cell during a fuel cell operating cycle facilitates the regular, efficient and timely removal of impurities from the fuel cell over time to optimize fuel cell function and longevity.

Purging of the anode loop of the fuel cell is accomplished by implementing regular, successive purge cycles throughout operation of the fuel cell. Successive purge periods are separated by periods of fuel cell operation during which the anode loop of the fuel cell is not being purged. Each of the purge periods includes multiple successive purge pulses, during each of which the anode loop is purged of impurities. The number of purge pulses, the pulse duration and the duration between purge pulses within a purge period are based on the running average current load on the fuel cell during the preceding purge cycle of the fuel cell, standard deviation of the cell voltages across the fuel cell stack, and maximum change of a cell voltage across the fuel cell stack. As used herein, "purge cycle" denotes the period of fuel cell operation from the beginning of one purge period until the beginning of the next purge period.

According to the time-based fuel cell purge method of the present invention, the timing of onset of a purge cycle is determined by the running average current load on the fuel cell during a fuel cell operating cycle, the standard deviation of the cell voltages across the fuel cell stack during the operating cycle, or the maximum change rate in the cell voltages during the operating cycle. Therefore, any one or all of three conditions must be met in order for initiation of a purge to occur. According to the first condition, a purge is initiated if the running average current load on the fuel cell during the preceding operating cycle of the fuel cell exceeds a standard value for the average current load [Time>F(Average Current)]. According to the second condition, a purge is initiated if the standard deviation of cell voltages for the fuel cell stack current exceeds a standard deviation threshold value of cell voltages for the fuel cell stack current [STD DEV (Cell Voltages)>Cell Voltage STD DEV Threshold (Stack Current)]. According to the third condition, a purge is initiated if the maximum change in any of the individual cell voltage measurements exceeds a maximum allowed cell voltage change rate for the stack current [Max d (Cell Voltage)/dt>Max Allowed Cell Voltage Change Rate (Stack Current)].

Within each purge period, the number of purge pulses, the duration of each purge pulse and the duration between purge pulses are determined based on different functions ($F_1$, $F_2$ and $F_3$, respectively) of the average current, the standard deviation of cell voltages and the maximum change in cell voltage during the operating cycle. Therefore, Number of Purge Pulses=$F_1$ [(Average Current, STD DEV (Cell Voltages), Max dCellV/dt)]; Pulse Duration=$F_2$ [(Average Current, STD DEV (Cell Voltages), Max dCellV/dt)]; and Duration Between Pulses=$F_3$ [(Average Current, STD DEV (Cell Voltages), Max dCellV/dt)]. Functions $F_1$, $F_2$ and $F_3$ may be determined based on physical equations, models or empirically.

Referring initially to the flow diagram of FIG. 1, throughout the operation of the fuel cell, a determination is continually made on whether to initiate a purge, based on the running average current load on the fuel cell during the operating cycle, standard deviation of the cell voltages across the fuel cell stack, and maximum change of a cell voltage across the fuel cell stack. Accordingly, in step 1, a timer is initiated at the beginning of the fuel cell operation. In step 2, the magnitude of current flowing through the fuel cell stack throughout the predetermined time period is measured. In step 3, the running average current load on the fuel cell during the predetermined time period is calculated. In step 4, the running average current load is compared to a predetermined average current load standard. In the event that the running average current load exceeds the predetermined average standard, the timer is reset in step 11, restarted in step 12 and a purge is initiated, as indicated at step 13.

In the event that the running average current load calculated in step 3 has not yet reached the predetermined average current load standard, a purge interval is not initiated and the method proceeds to step 5. In step 5, the individual cell voltages across the entire fuel cell stack are measured. In step 6, the standard deviation of the cell voltages is calculated. In step 7, the calculated standard deviation of the cell voltages is compared to a predetermined standard deviation threshold value for the stack current cell voltages. In the event that the standard deviation of the cell voltages exceeds the threshold value, the timer is reset in step 11, restarted in step 12 and a purge is initiated, as indicated in step 13.

In the event that the standard deviation of the cell voltages calculated in step 6 is less than or equal to the standard deviation threshold value for the stack current cell voltages, a purge is not initiated and the method proceeds to step 8. In step 8, the maximum rate of change in the cell voltages [max d(cell voltage)/dt] is determined. In step 9, the maximum rate of change in the cell voltages is compared to the maximum allowed cell voltage change rate of the stack current. In the event that the maximum rate of change in the cell voltages is equal to or less than the maximum allowed cell voltage change rate, a purge is not initiated and the cell voltages are stored for a subsequent calculation at step 9, as indicated in step 10.

In the event that the maximum rate of change in the, cell voltage exceeds the maximum allowed cell voltage change rate of the stack current, the timer is reset in step 11, restarted in step 12 and a purge is initiated, as indicated at step 13. After the purge, the cycle is repeated starting with step 2.

Figure 2:
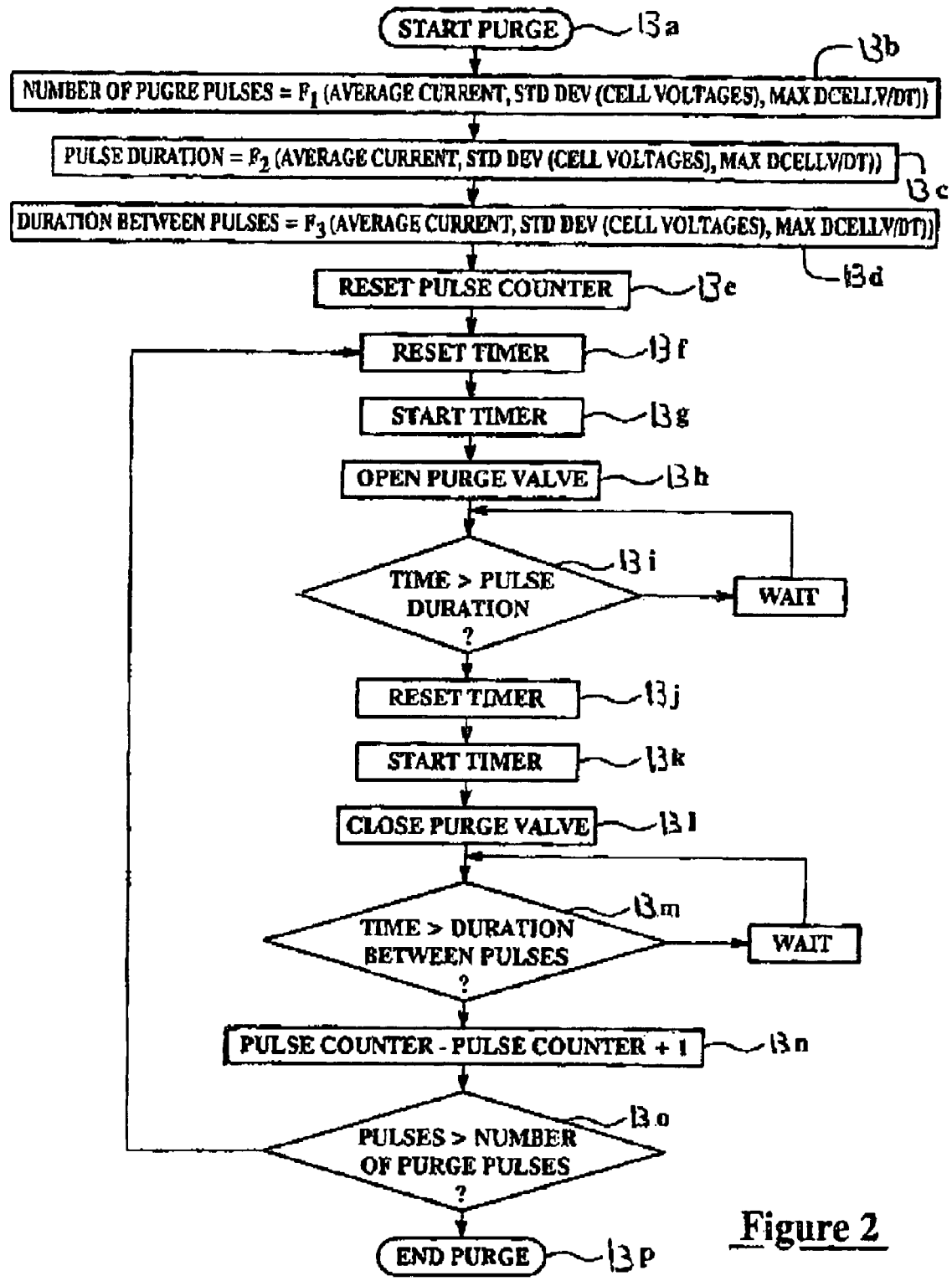
FIG. 2 is a flow diagram illustrating sequential process steps carried out in the implementation of a fuel cell purge according to the time-based fuel cell purge method of the present invention.

Referring next to the flow diagram of FIG. 2, each purge period begins at step 13a by calculation of the number of purge pulses, the pulse duration and the duration between pulses in the purge period. In step 13b, the number of purge pulses in the purge period is determined by calculating a first function ($F_1$) of the average current, which was previously calculated at step 4 of the flow diagram in FIG. 1; the standard deviation of cell voltages, which was previously calculated at step 6 of the flow diagram in FIG. 1; and the maximum change in cell voltages, which was previously calculated at step 8 of the flow diagram in FIG. 1. In step 13c, the pulse duration of each pulse in the purge period is determined by calculating a second function ($F_2$) of the average current, the standard deviation of cell voltages and the maximum change in cell voltages. In step 13d, the duration between successive pulses in the purge period is determined by calculating a third function ($F_3$) of the average current, the standard deviation of cell voltages and the maximum change in cell voltages.

Upon completion of steps 13b, 13c and 13d, the pulse counter is reset at step 13e and the pulse timer is reset at step 13f. At step 13g, a pulse timer is initiated, at which time a purge valve is opened (step 13h). This facilitates the flow of nitrogen or other inert gas out of the anode loop of the fuel cell to purge impurities from the fuel cell, according to the knowledge of those skilled in the art. In step 13i, the purge valve is maintained in an open position for a time period (pulse duration) that corresponds to the second function $F_2$, which was previously calculated in step 13c.

After the time period (pulse duration) corresponding to function $F_2$ has elapsed, the number of purge pulses implemented up to that point in the purge period is determined in step 13o. If the number of purge pulses determined in step 13o equals or exceeds the number of purge pulses corresponding to the first function $F_1$, then the purge is terminated in step 13p. Otherwise, if the number of pulses determined in step 13o has not reached the number of purge pulses corresponding to the first function $F_1$, then the purge timer is reset in step 13j and started in step 13k. The purge valve is closed in step 13l. In step 13m, the timer measures the duration between successive pulses in the purge period. This duration between pulses corresponds to the function F3, previously calculated in step 13d. Once the time duration between pulses has elapsed, the timer reset at step 13f and another purge pulse is initiated.

Figure 3:
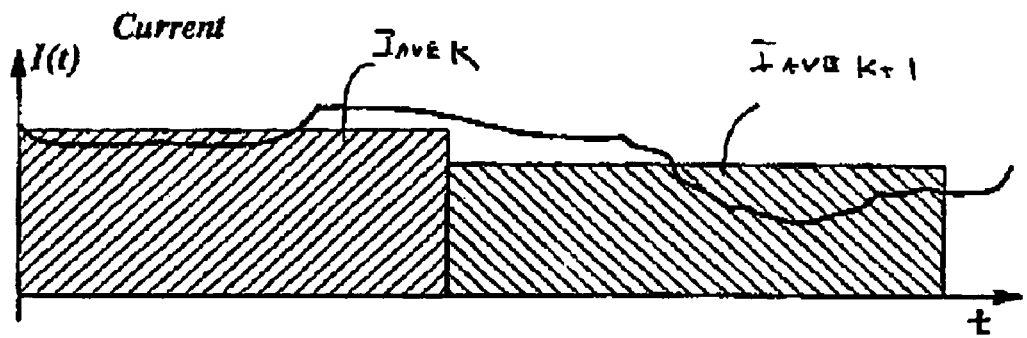
FIG. 3 contains graphs which provide a visual indication of the correlation between the running average current, the duration between purge cycles, the duration of each purge period in a purge cycle, and the timing of purge pulses within purge period. The Purge period is defined as the duration of the purge valve(s) flowing anode gas to the atmosphere in a repetitive cycle. The purge cycle denotes the period of fuel cell operation from the beginning of one purge period until the beginning of the next purge period.
Figure 3:
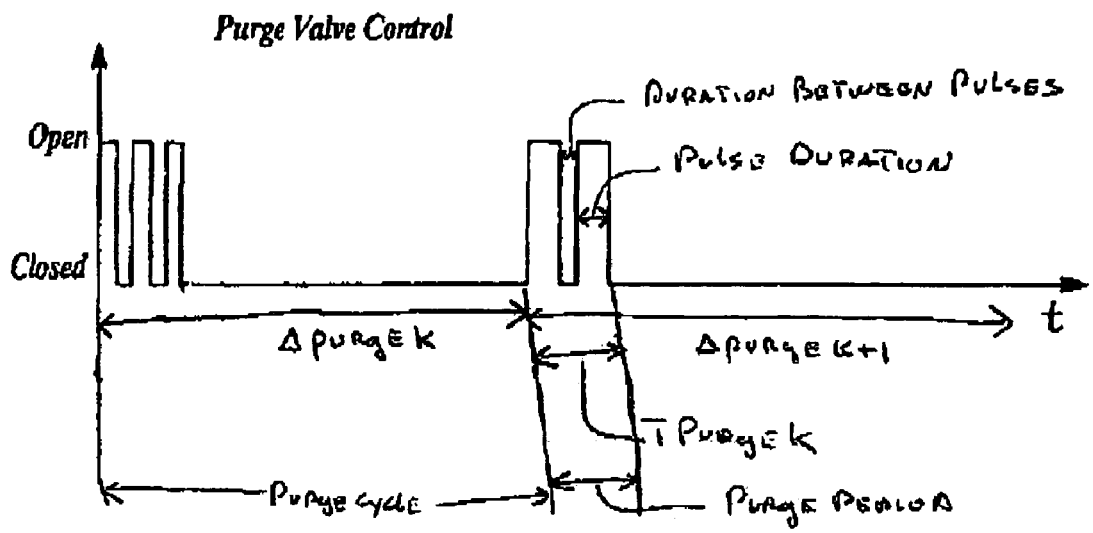

Referring next to the graph of FIG. 3, the relationship between the average current during the $k^{th}$ purge cycle($I_{AVEk}$) and the timing and duration of purge pulses in a purge period is shown. In the graph, the duration between the beginnings of the $(k-1)^{th}$ and $k^{th}$ purge periods is designated by $\Delta_{Purgek}$ while the pulse period duration, in $(k+1)^{th}$ purge cycle is designated by $T_{Purgek}$. Onset of each purge period depends on whether the average current load on the fuel cell exceeds a standard value for the average current load, whether the standard deviation of cell voltages for the fuel cell stack exceeds a cell voltage standard deviation threshold value for the stack current, or whether the maximum change in cell voltage over time exceeds the maximum allowed cell voltage change rate in the stack current. The duration between the beginnings of the purge periods ($\Delta_{purge}$) and the purge period duration ($T_{purge}$) are determined using different functions of the average current load on the fuel cell, the standard deviation of cell voltages across the fuel cell stack, and the maximum change in cell voltages.

The mathematical relationship between the purge period duration in $k^{th}$ purge cycle, and the average current load on the fuel cell stack, the standard deviation of cell voltages across the fuel cell stack, and the maximum change in cell voltages is expressed by the formula:

$$T_{purge_k} = f\left(I_{ave_k}, STDEV(CellV), \max\left(\frac{d\,CellV}{dt}\right)\right)$$

where $T_{Purgek}$ is the purge period duration after $k^{th}$ purge cycle; f is a function (it can be expressed through $F_1$, $F_2$ and $F_3$); and $I_{AVEk}$ is the average current load on the fuel cell stack during the $k^{th}$ purge cycle. The mathematical relationship between the average current and the duration between purge pulses is expressed by the formula:

$$I_{ave_k}(t) = \frac{\int_0^t I(\tau)d\tau}{t}$$

where $I_{AVEk}(t)$ is the running average current load on the fuel cell stack during the kth purge cycle, and t is the time elapsed from beginning of the last purge period.

While the preferred embodiments of the invention have been described above, it will be recognized and understood that various modifications can be made in the invention and the appended claims are intended to cover all such modifications which may fall within the spirit and scope of the invention.

What is claimed is:

1. A method of purging a fuel cell, comprising:
   determining for a first statistical measure of a current load on said fuel cell comprising a running average current load on said entire fuel cell, a second statistical measure of cell voltages of said fuel cell comprising a standard deviation of all cell voltages of said fuel cell, and a maximum change in each cell voltage of said fuel cell;
   establishing a first threshold related to the first statistical measure, a second threshold related to the second statistical measure and a maximum rate of change related to the cell voltage; and
   purging said fuel cell if at least one of the following conditions exists:
      said first statistical measure exceeds said first threshold related to the first statistical measure,
      said second statistical measure exceeds said second threshold value related to the second statistical measure, and
      said maximum change in cell output parameter exceeds said maximum rate of change related to the cell voltage;
   wherein a purge period is determined by a plurality of functions formulated based on said running average current load on said fuel cell, said standard deviation of cell voltage of said fuel cell and said maximum change in cell voltage of said fuel cell.

2. The method of claim 1 wherein said purging said fuel cell comprises initiating a purge period.

3. The method of claim 2 wherein said purge period comprises a number of successive purge pulses each having a pulse duration and a duration between pulses separating successive purge pulses in said purge period.

4. The method of claim 3 further comprising determining said number of successive purge pulses by formulating a function of said average current load on said fuel cell, said standard deviation of cell voltage of said fuel cell and said maximum change in cell voltage of said fuel cell.

5. The method of claim 4 wherein said function is determined using one of physical equations, modeling and empirical data.

6. The method of claim 3 further comprising determining said pulse duration by formulating a function of said average current load on said fuel cell, said standard deviation of cell voltage of said fuel cell and said maximum change in cell voltage of said fuel cell.

7. The method of claim 6 wherein said function is determined using one of physical equations, modeling and empirical data.

8. The method of claim 3 further comprising determining said duration between pulses by formulating a function of said average current load on said fuel cell, said standard deviation of cell voltage of said fuel cell and said maximum change in cell voltage of said fuel cell.

9. The method of claim 8 wherein said function is determined using one of physical equations, modeling and empirical data.

10. A method of purging a fuel cell, comprising:
    determining a running average current load on said entire fuel cell, a standard deviation of all cell voltages of said fuel cell and a maximum change in each cell voltage of said fuel cell;
    comparing said average current load on said fuel cell to an average current load standard;
    purging said fuel cell if said average current load on said fuel cell exceeds said average current load standard;
    comparing said standard deviation of cell voltages of said fuel cell to a standard deviation threshold value if said average current load on said fuel cell does not exceed said average current load standard;
    purging said fuel cell if said standard deviation of cell voltages exceeds said standard deviation threshold value;
    comparing said maximum change in cell voltage to a maximum allowed cell voltage change rate if said standard deviation of cell voltages does not exceed said standard deviation threshold value; and
    purging said fuel cell if said maximum change in cell voltage exceeds said maximum allowed cell voltage change rate;
    wherein a purge period is determined by a plurality of functions formulated based on said running average current load on said fuel cell, said standard deviation of cell voltage of said fuel cell and said maximum change in cell voltage of said fuel cell.

11. The method of claim 10 wherein said purging said fuel cell comprises initiating a purge.

12. The method of claim 11 wherein said purge period comprises a number of successive purge pulses each having a pulse duration and a duration between pulses separating successive purge pulses in said purge period.

13. The method of claim 12 further comprising determining said number of successive purge pulses by formulating a function of said average current load on said fuel cell, said standard deviation of cell voltage of said fuel cell and said maximum change in cell voltage of said fuel cell.

14. The method of claim 13 wherein said function is determined using one of physical equations, modeling and empirical data.

15. The method of claim 12 further comprising determining said pulse duration by formulating a function of said average current load on said fuel cell, said standard deviation of cell voltage of said fuel cell and said maximum change in cell voltage of said fuel cell.

16. The method of claim 15 wherein said function is determined using one of physical equations, modeling and empirical data.

17. The method of claim 12 further comprising determining said duration between pulses by formulating a function of said average current load on said fuel cell, said standard deviation of cell voltage of said fuel cell and said maximum change in cell voltage of said fuel cell.

18. The method of claim 17 wherein said function is determined using one of physical equations, modeling and empirical data.

19. A method of purging a fuel cell, comprising:
    determining a purge comprising a number of successive purge pulses each having a pulse duration and a duration between pulses separating successive purge pulses in a purge period;
    determining a running average current load on said fuel cell, a standard deviation of all cell voltages of said fuel cell and a maximum change in each cell voltage of said fuel cell;

formulating first, second and third functions of said average current load on said fuel cell, said standard deviation of cell voltages of said fuel cell and said maximum change in cell voltage of said fuel cell; and determining said number of successive purge pulses based on said first function, determining said pulse duration based on said second function and determining said duration between pulses based on said third function;

establishing an average current load standard, a standard deviation threshold value and a maximum allowed cell voltage change rate; and initiating said purge if at least one of the following conditions exists:

said average current load exceeds said average current load standard, said standard deviation of cell voltages exceeds said standard deviation threshold value, and said maximum change in cell voltage exceeds said maximum allowed cell voltage change rate.

20. The method of claim 19 wherein said first function, said second function and said third function are determined using one of physical equations, modeling and empirical data.

21. The method of claim 19 further comprising:

comparing said average current load on said fuel cell to an average current load standard;

initiating said purge if said average current load on said fuel cell exceeds said average current load standard;

comparing said standard deviation of cell voltages of said fuel cell to a standard deviation threshold value if said average current load on said fuel cell does not exceed said average current load standard;

initiating said purge if said standard deviation of cell voltages exceeds said standard deviation threshold value;

comparing said maximum change in cell voltage over time to a maximum allowed cell voltage change rate if said standard deviation of cell voltages does not exceed said standard deviation threshold value; and initiating said purge if said maximum change in cell voltage over time exceeds said maximum allowed cell voltage change rate.

* * * * *